(12) United States Patent
Wang et al.

(10) Patent No.: US 8,560,474 B2
(45) Date of Patent: Oct. 15, 2013

(54) SYSTEM AND METHOD FOR PROVIDING ADAPTIVE MANUFACTURING DIAGNOSES IN A CIRCUIT BOARD ENVIRONMENT

(75) Inventors: Zhiyuan Wang, Fremont, CA (US);
Xinli Gu, Sunnyvale, CA (US);
Zhanglei Wang, Fremont, CA (US);
Zhaobo Zhang, Santa Clara, CA (US);
Haoming Zong, Shanghai (CN)

(73) Assignee: Cisco Technology, Inc., San Jose, CA (US)

(*) Notice: Subject to any disclaimer, the term of this patent is extended or adjusted under 35 U.S.C. 154(b) by 347 days.

(21) Appl. No.: 13/042,153

(22) Filed: Mar. 7, 2011

(65) Prior Publication Data
US 2012/0233104 A1 Sep. 13, 2012

(51) Int. Cl.
*G06N 5/00* (2006.01)

(52) U.S. Cl.
USPC ............................................. 706/21; 706/45

(58) Field of Classification Search
USPC ..................................................... 706/21, 45
See application file for complete search history.

(56) References Cited

U.S. PATENT DOCUMENTS

| | | | |
|---|---|---|---|
| 4,258,421 A | 3/1981 | Juhasz et al. |
| 4,270,174 A | 5/1981 | Karlin et al. |
| 4,463,418 A | 7/1984 | O'Quin, II et al. |
| 4,517,468 A | 5/1985 | Kemper et al. |
| 4,695,946 A | 9/1987 | Andreasen et al. |
| 4,823,914 A | 4/1989 | McKinney et al. |
| 4,937,763 A | 6/1990 | Mott |
| 4,970,725 A | 11/1990 | McEnroe et al. |
| 4,977,390 A | 12/1990 | Saylor et al. |
| 5,107,500 A | 4/1992 | Wakamoto et al. |
| 5,113,489 A | 5/1992 | Cihiwsky et al. |
| 5,123,017 A | 6/1992 | Simpkins et al. |
| 5,274,572 A | 12/1993 | O'Neill et al. |
| 5,282,127 A | 1/1994 | Mii |
| 5,321,837 A | 6/1994 | Daniel et al. |
| 5,329,465 A | 7/1994 | Arcella et al. |
| 5,400,018 A | 3/1995 | Scholl et al. |
| 5,422,890 A | 6/1995 | Klingsporn et al. |
| 5,442,553 A | 8/1995 | Parrillo |
| 5,445,347 A | 8/1995 | Ng |
| 5,995,915 A | 11/1999 | Reed et al. |
| 6,324,665 B1 | 11/2001 | Fay |

(Continued)

OTHER PUBLICATIONS

Mullerheim, Adaptive Diagnostic System, Project Final Report Transit IDEA Project 2, Transit IDEA Program Transportation Research Board National Research Council, 1998, pp. 1-35.*

(Continued)

Primary Examiner — Wilbert L Starks
(74) Attorney, Agent, or Firm — Patent Capital Group

(57) ABSTRACT

An example method is provided and includes collecting inputs for a circuit board under test; evaluating historical repair records using a neuron network; providing repair actions for the circuit board based on the historical repair records; and providing an output reflecting a particular component of the circuit board to be replaced or to be repaired, where the output is associated with a developed probability of successfully fixing an issue that was identified by the test. In more specific implementations, the inputs include fault syndromes and log files associated with the circuit board under test. Additionally, at least one of the inputs of the neuron network is a syndrome vector extracted from a failure log. In yet other instances, particular outputs having higher probabilities are selected as the repair actions. The neuron network can be weighted using diagnosis knowledge weights.

20 Claims, 7 Drawing Sheets

(56) References Cited

U.S. PATENT DOCUMENTS

| | | |
|---|---|---|
| 6,567,933 B1 | 5/2003 | Swoboda et al. |
| 7,100,084 B2 | 8/2006 | Unkle et al. |
| 7,171,586 B1 | 1/2007 | Gross et al. |
| 7,171,589 B1 | 1/2007 | Urmanov et al. |
| 7,487,058 B2 | 2/2009 | Gross et al. |
| 7,610,173 B2 | 10/2009 | Gross et al. |
| 7,844,861 B2 | 11/2010 | Hegarty et al. |
| 7,958,408 B2 | 6/2011 | De Obaldia et al. |
| 2001/0005821 A1 | 6/2001 | Ottosson |
| 2002/0175697 A1 | 11/2002 | Miller et al. |
| 2003/0216890 A1 | 11/2003 | Gross et al. |
| 2004/0078634 A1 | 4/2004 | Gilstrap et al. |
| 2008/0115014 A1 | 5/2008 | Vaidyanathan |
| 2008/0228462 A1 | 9/2008 | Gross et al. |
| 2009/0106600 A1 | 4/2009 | Gross et al. |
| 2010/0070232 A1 | 3/2010 | Fritz et al. |
| 2011/0314335 A1 | 12/2011 | Tanaka |
| 2012/0066548 A1 | 3/2012 | Barker et al. |

OTHER PUBLICATIONS

U.S. Appl. No. 12/873,135, filed Aug. 31, 2010, entitled "System and Method for Executing Functional Scanning in an Integrated Circuit Environment," Inventors: Zhiyuan Wang, et al.

Roman Trobec and Izidor Jerebic, "Optimization of Diagnostic Examination," University of Ljubljana, Jozef Stefan Institute, Ljubljana, Slovenia, retrieved from Google Scholar and printed Aug. 9, 2010, 12 pages.

USPTO Mar. 14, 2013 Non-Final Office Action from U.S. Appl. No. 12/873,135.

Goessel, M. et al., "Code disjoint self-parity combinational circuits for self-testing, concurrent fault detection and parity scan design," VLSI Test Symposium, 1994. Proceedings, $12^{th}$ IEEE, pp. 151-157, Apr. 25-28, 1994.

Fang, Hongxia, et al., "Mimicking of Functional State Space with Structural Tests for the Diagnosis of Board Level Functional Failures," Asian Test Symposium ATS 2010 19th IEEE, pp. 421-428, Dec. 14, 2010.

* cited by examiner

FIG. 5

```
Summary: Interfaces< r2d2 -- metro  > counts - Fail(mismatch)
......
Info : R2D2-2 Error/Drop Counters Detected
464. (00000247) ERR   EG   R2D2_ARIC_CP_DBUS_CRC_ERR
......
Error       : (000001A) DIAGERR_ERRISO_INVALID_PKT_CNT: Packet count invalid
```

80

- SYNDROMES ARE PARSED IN 8 DIMENSIONS.
  -(1) ERROR IDENTIFICATION, (2) MISMATCHED INTERFACE, (3) COMPONENT WITH ERROR/DROP COUNTER, (4) ERROR COUNTER, (5) DROP COUNTER, (6) COMPONENT WITH INTERRUPTS, (7) INTERRUPT BITS (8) ERROR MESSAGES

- ACTIONS ARE FROM REPAIR HISTORY, INCLUDING COMPONENT NUMBER AND INSTANCE IDENTIFICATION.

SYSTEM AND METHOD FOR PROVIDING ADAPTIVE MANUFACTURING DIAGNOSES IN A CIRCUIT BOARD ENVIRONMENT

TECHNICAL FIELD

This disclosure relates generally to the field of circuit testing and, more particularly, to providing adaptive manufacturing diagnoses in a circuit board environment.

BACKGROUND

As products become increasingly complex, it is difficult to keep end-to-end manufacturing yield at a satisfactory level. In many testing scenarios, once a failing board is detected at the manufacturing test line, it is sent to another department for repair. After replacement or repair actions have been completed, the circuit board is sent back to the test line. With today's massive production volume and sensitivity to yield, the time available for diagnosis technicians to debug a given defective circuit board is limited.

One of the challenges in repairing defective circuit boards is that the diagnosis software commonly lacks any type of fault isolation capability. This lack of precision leads to an inability to provide unambiguous repair guidance. In many scenarios, ill-conceived repair guidance leads to incorrect repair actions being pursued. The cost to replace an expensive component and, further, the time to retest a failing circuit board can significantly impact the economics of any business model. As a general proposition, effectively addressing these problematic testing issues presents a significant challenge to equipment vendors, electronics suppliers, engineering technicians, and system designers alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 5 is a simplified block diagram illustrating an example fault syndrome and repair action extraction in accordance with one embodiment of the present disclosure.

DETAILED DESCRIPTION OF EXAMPLE EMBODIMENTS OVERVIEW

An example method is provided and includes collecting inputs for a circuit board under test; evaluating historical repair records using a neuron network; providing repair actions for the circuit board based on the historical repair records; and providing an output reflecting a particular component of the circuit board to be replaced or to be repaired, where the output is associated with a developed probability of successfully fixing an issue that was identified by the test.

In more specific implementations, the inputs include fault syndromes and log files associated with the circuit board under test. Additionally, at least one of the inputs of the neuron network is a syndrome vector extracted from a failure log. In yet other instances, particular outputs having higher probabilities are selected as the repair actions. The neuron network can be weighted using diagnosis knowledge weights. Furthermore, the inputs can include syndromes selected based on hardware designs and software designs related to the circuit board. A resultant of the repair actions can be fed back into the neuron network.

Example Embodiments

Figure 1:
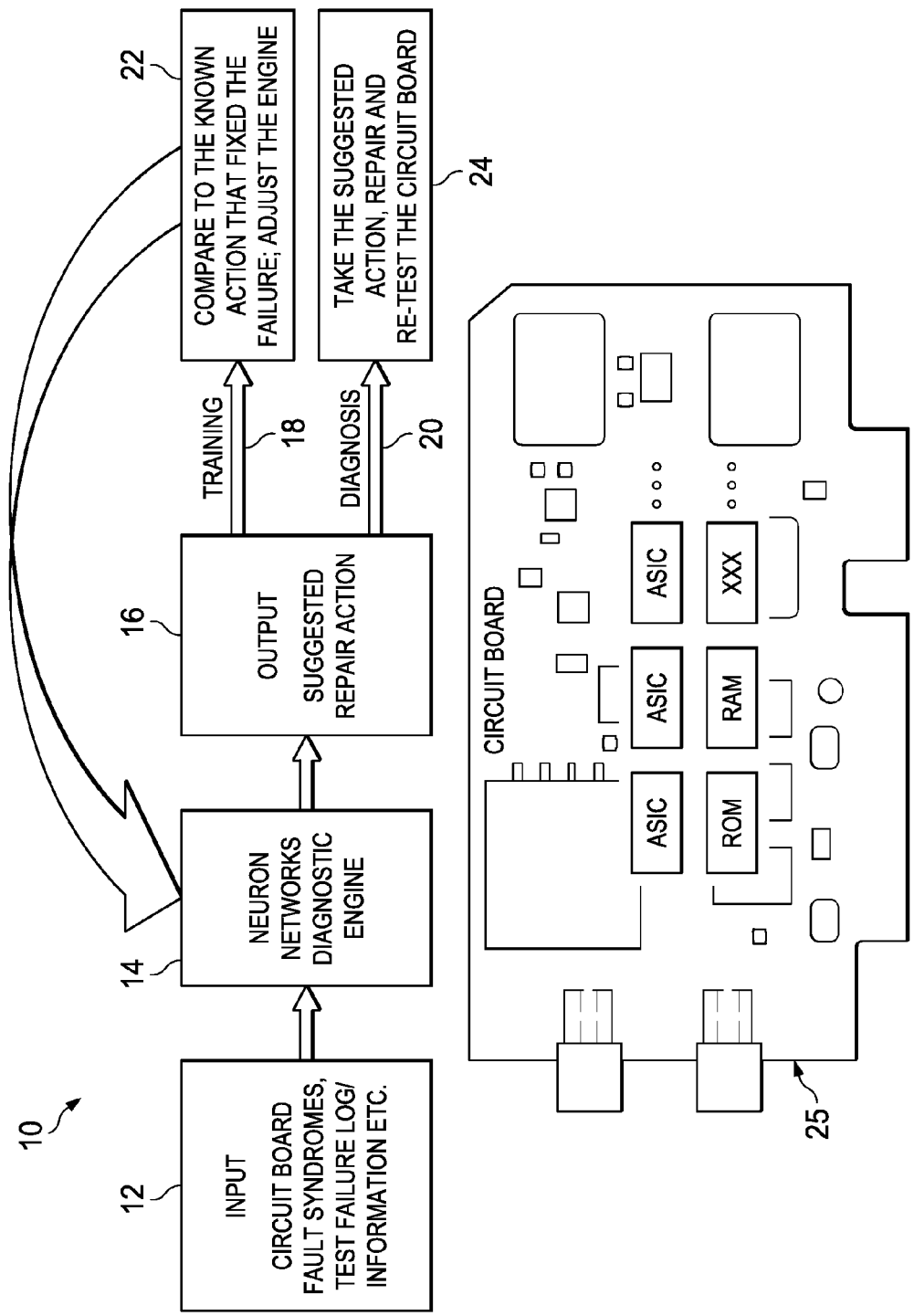
FIG. 1 is a simplified diagram of a system associated with providing adaptive manufacturing diagnoses in a circuit board environment in accordance with one embodiment of the present disclosure.

Turning to FIG. 1, FIG. 1 is a simplified diagram illustrating a system 10 for providing adaptive manufacturing diagnoses in a circuit board environment in accordance with one embodiment. System 10 may include an input 12, a neuron networks diagnostic engine 14, and an output 16. In a particular implementation, input 12 can be associated with circuit board fault syndromes, test failure logs/information, or any other suitable input parameter, as further discussed below. Output 16 may be associated with suggested repair actions, which can identify components to be fixed, replaced, adjusted, etc.

Additionally, FIG. 1 illustrates decision options indicated by a training arrow 18 and a diagnosis arrow 20. Training arrow 18 can lead to a compare segment 22 in which a resultant is compared to a known action that fixed a related failure associated with a given circuit board (e.g., a piece of hardware, a piece of software, etc.). Additionally, neuron networks diagnostic engine 14 can be adjusted as a result of this comparison activity. In regards to diagnosis arrow 20, the suggested action may be executed at this juncture, where repairs may be completed and the associated circuit board retested.

Additionally, FIG. 1 illustrates a circuit board 25 that may include any suitable electronic components. In general terms, circuit board 25 can be used to mechanically support and to electrically connect electronic components using conductive pathways, tracks, and/or signal traces. Circuit board 25 can be populated with electronic components (e.g., in conjunction with a printed circuit assembly (PCA) or a printed circuit board assembly (PCBA)). Accordingly, circuit board 25 can include any number of internal components such as an application specific integrated circuit (ASIC), a read only memory (ROM), a random access memory (RAM), capacitors, resistors, logic gates, or any other suitable component. Additionally, it should be noted that circuit board 25 can be integral to any type of electronic element (e.g., a router, a switch, a gateway, an endpoint, a mobile telephone, a computer, etc.).

Note that for purposes of discussion, it is important to understand the common issues encountered in testing environments associated with system 10. The following foundational information may be viewed as a basis from which the present disclosure can be properly explained. Chip suppliers (e.g., Texas Instruments, IBM, etc.) manufacture integrated circuits to be included in various types of devices, components, equipment, etc. As part of their quality control measures, these companies can execute structural tests, which can evaluate memory components, logic, etc. (i.e., referred to as component level tests). Subsequently, those chips are sent to another company that assembles circuit boards, which include these manufactured electronics. The circuit boards can then be deployed in any suitable electronic device, component, or appliance. At this juncture, there is a second round of testing that evaluates the functional aspects of the circuit board (i.e., referred to as system level tests). For example, if the resultant device is a router, then the functional test may include routing packets through the circuit board of the router.

When diagnosis software fails to provide clear repair guidance, a technician has to take actions based on his/her own experience. As expected, the efficiency of a senior technician is notably higher than that of an inexperienced technician. However, debug knowledge is difficult to formulate, document, organize, accumulate, and transfer between colleagues. Experienced testing technicians are typically burdened by short time frames, and increased workloads, where training of junior technicians is virtually impossible. Moreover, viewing the industry as a whole, there is considerable employee turnover in such testing technologies, which only adds to these challenges.

Hence, most debugging work is ad hoc and lacks of any systematic debugging protocol. This results in higher costs for individuals involved in the manufacturing of electronic products. In most circuit board applications, failed parts have to be replaced after assembly. However, in many cases, an incorrect replacement occurs, which further lengthens the product delivery timeline. The cost to replace an expensive component and, further, the time to retest the circuit board can significantly impact profit margins, business partner deadlines, product rollout schedules, etc.

It should also be noted that in testing scenarios, it is difficult to identify exact moments of failure and, subsequently, lock and reproduce the failure state for debugging. Diagnosis software universally lacks any type of fault isolation capability. This lack of precision leads to an inability to provide accurate repair guidance. In many scenarios, deficient repair guidance engenders incorrect repair actions. Suppliers are simply seeking to understand error conditions, device defects, component failures, etc. in order to take remedial actions such that future errors can be avoided. Device or component failures in board testing scenarios create unwanted lag time (e.g., several months of debugging for the testing engineers involved).

In accordance with certain teachings of the present disclosure, system 10 offers a methodology to address the aforementioned challenges in providing improved repair suggestions that are based on historical manufacturing data. Logistically, repair histories from manufacturing sites can be used to train neuron networks, which in turn construct relationships between failure syndromes and corresponding repair actions. After training is completed, the neuron networks are able to predict repair actions (having high success probabilities) for a given failing circuit board. Hence, system 10 can offer an adaptive diagnosis, which takes advantage of historical repair records in conjunction with artificial intelligence. Such a protocol can improve manufacturing yield, reduce diagnosis time, and reduce costs incurred by incorrect repairs. The neuron networks can be provisioned as software (inclusive of algorithms), hardware, or any suitable combination or hybrid thereof.

In contrast to these capabilities of system 10, previous methodologies have been unable to solve a number of problems associated with common testing scenarios. For example, in the case of rule-based diagnosis, rule-based diagnostic systems take the form "IF syndrome(s), THEN fault(s)" to locate the fault(s). Hundreds or thousands of rules may be required to represent knowledge for a system under test. Rule-based diagnosis involves extracting syndromes from the failure and, further, the rules that match the syndromes. This process is repeated iteratively until the root cause of the failure is found. Rule-based expert systems have been developed for circuit board repair and maintenance. While such a flow is simplistic, it is difficult to acquire the knowledge to build the rules (i.e., commonly known as a knowledge acquisition bottleneck).

In the case of model-based diagnosis, this framework uses a model to predict faults: taking into account the observations and information from a real system. The model is an approximate representation of the real system under diagnosis. Models are often constructed in a hierarchical fashion. The initial diagnosis results (e.g., using a high-level model) are passed to the next level diagnosis with a detailed model. A model-based diagnosis is easier to represent complex structured knowledge, compared to rule-based techniques and, thus, leads to computational efficiency. However, the bottleneck is the model construction for such modern complex systems.

For a case-based diagnosis, this typically involves storing experiences of past solutions (known as cases), retrieving a suitable case to solve a new problem, and revising the adapted case based on its level of success. The notion of 'case storage' addresses what to store in a case, along with selecting an appropriate structure for representing the characteristics of the case. Separately, 'case retrieval' consists of identifying the features of a current problem, using the features to search for similar cases in the database (e.g., cases are typically ranked in order of similarity), and eventually selecting the most similar case (i.e., using a matching scheme). Compared to rule-based and model-based techniques, the performance of the diagnostic system is not fixed. It can be continually improved by exploiting the knowledge from the previously successful/failed diagnosis. The effectiveness of case-based diagnosis depends on the availability of suitable cases (which are generated from previous data or simulation), the extraction of effective features of the cases, and the matching scheme.

In the intelligent diagnosis protocol of system 10, a case-based diagnosis is effectively being combined with artificial intelligence (e.g., neuron networks). Semantically, the proposed adaptive diagnosis methodology can be based on historical repair data collected from various manufacturing sites. For each failing circuit board, all related information (e.g., including test stage, test name, test condition, log files, and/or repair actions) can be saved into a centralized database.

Figure 2:
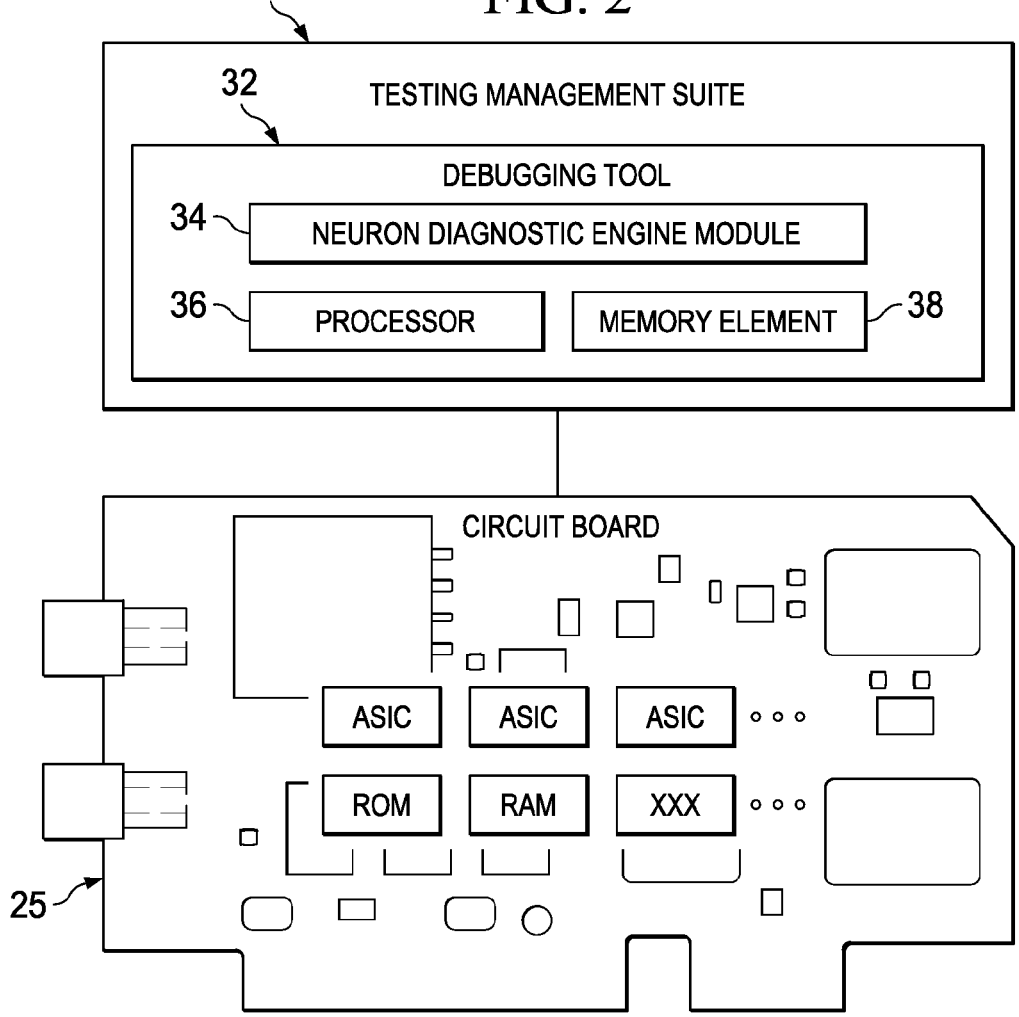
FIG. 2 is a simplified block diagram of a possible implementation of the system associated with providing adaptive manufacturing diagnoses in a circuit board environment.

Turning to FIG. 2, FIG. 2 is a simplified block diagram illustrating a testing management suite 30 in accordance with one embodiment of the present disclosure. In this particular implementation, testing management suite 30 may include a debugging tool 32, which may further include a neuron diagnostic engine module 34, a processor 36, and a memory element 38. Testing management suite 30 may be part of any appropriate manufacturing and/or testing system. For example, testing management suite 30 and/or debugging tool 32 may be provisioned in a computer, in handheld devices, as software, as a testing tool, as hardware, etc. Hence, the term 'debugging tool' and 'testing management suite' are broad terms that include any of the aforementioned elements, along with any other element capable of performing the activities described herein. Moreover, any of the described adaptive manufacturing diagnoses activities (discussed herein) may be supported by various software and/or hardware implementations (some of which are detailed in the ensuing FIGURES). Other possibilities are clearly within the broad scope of the present disclosure. In the context of the operational aspects of the present disclosure, to achieve test and diagnosis efficiency, any suitable software or hardware tools can be used.

For example, a diagnostic (automatic) tool could leverage the neuron networks to provide the adaptive diagnoses, as described herein.

Note that in terms of developing the actual neuron network to be used in system 10, it should be appreciated that neuron networks are widely used in pattern classification, along with its variants (e.g., fault diagnosis, cancer analysis, species classification, etc.). The term 'neuron network' is interchangeable with the term 'neural network' as used herein in this Specification. Neuron networks are attractive for circuit board level testing due to the complexity of the circuit boards. Prediction accuracy and training complexity are two main concerns in the application of neuron networks. In addition, neuron networks' remarkable performance is accompanied by challenges in interpreting how the networks actually process the data.

System 10 can be configured to develop and implement a simple, effective structure of neuron networks with a single layer and with one output neuron. This would allow the structure to be scalable to larger datasets, and it can be quickly trained. Moreover, testing technicians can initialize the weights for the neuron networks, which greatly improves the diagnosis accuracy. The initial weights can be determined by the occurrence possibilities of failure syndromes in the log files. Finally, if-then rules can be automatically extracted from this structure based on the weights. These rules provide significant insights in understanding and diagnosing the failures. Additional details associated with such neuron networks are provided below in conjunction with discussions related to FIGS. 3-4B.

Figure 3:
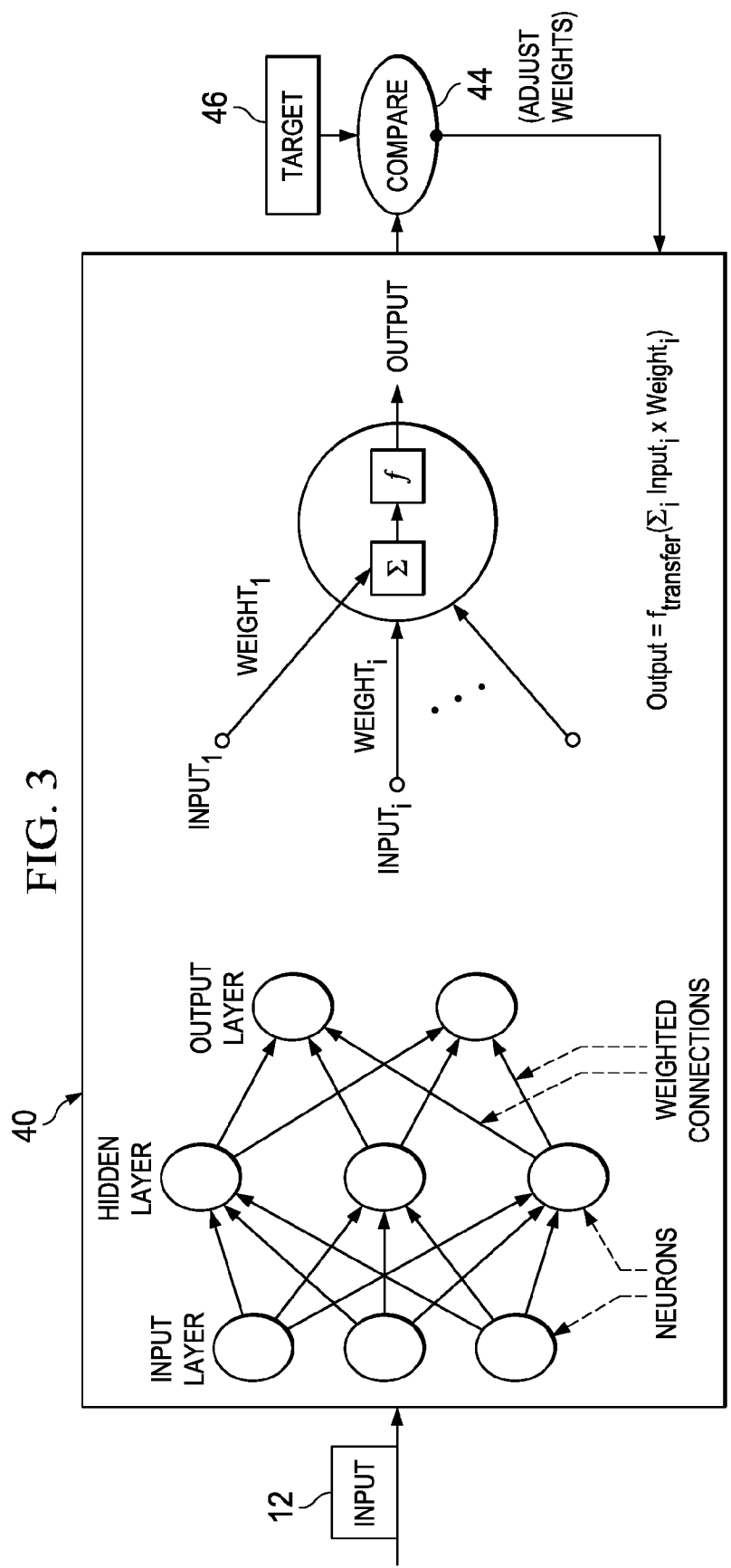
FIG. 3 is a simplified block diagram illustrating example neuron networks in accordance with one embodiment of the present disclosure.

FIG. 3 is a simplified block diagram illustrating one possible implementation associated with a set of neuron networks 40. Neuron networks 40 include a hidden layer, an input layer, an output layer, neurons, and weighted connections. Additionally, FIG. 3 includes segments associated with a compare 44, a target 46, along with an arrow indicative of weight adjustments.

In operation, before initiating the activities of system 10, a large number of training cases can be collected in order to properly train neuron networks 40. Once trained, neuron networks 40 can predict repair actions for other failing circuit boards. Historical repair records, whether they are successful or not, can be used as training cases for neuron networks 40. The actual syndromes can be selected based on the design of the underlying hardware and/or the diagnosis software. Examples of syndromes extracted from log files can include: 1) failing test stage, test name, error ID, and test parameters; 2) environmental conditions (voltage, temperature, frequency, etc.); 3) names and values of error/packet/drop counters that flag errors; and 4) names and values of interrupts that are triggered.

Figure 4A:
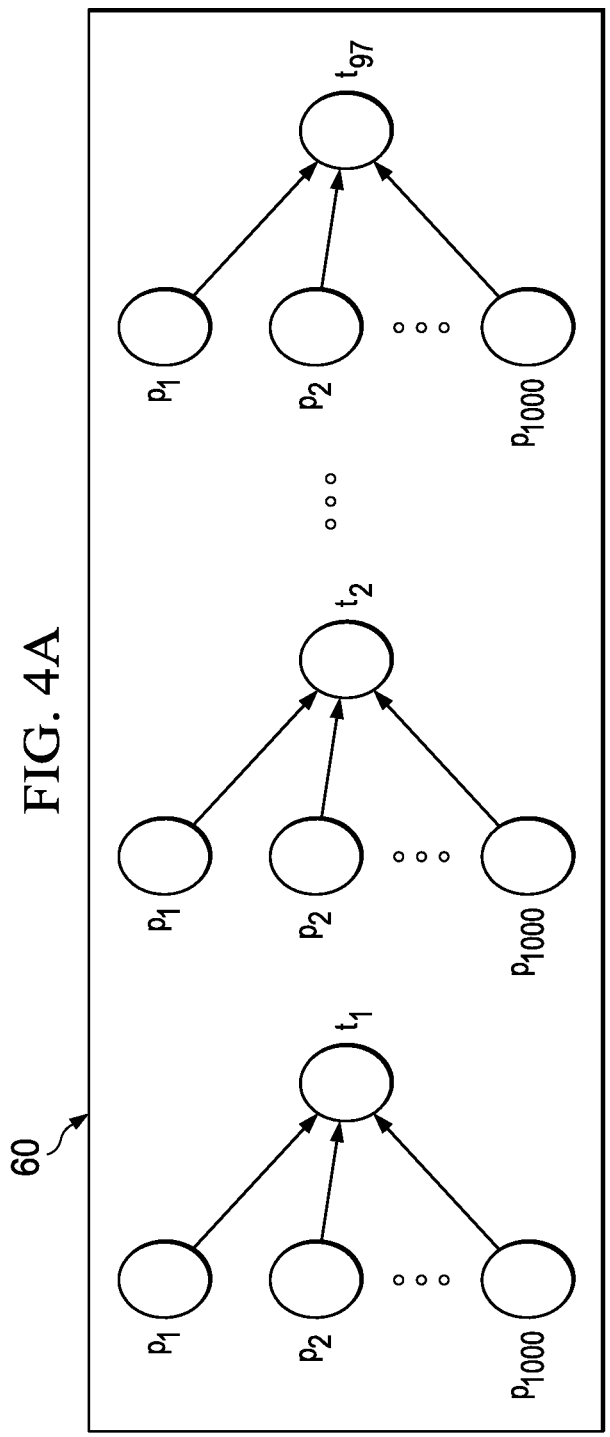
FIGS. 4A-4B are simplified block diagrams illustrating example neuron networks in accordance with one embodiment of the present disclosure.
Figure 4B:
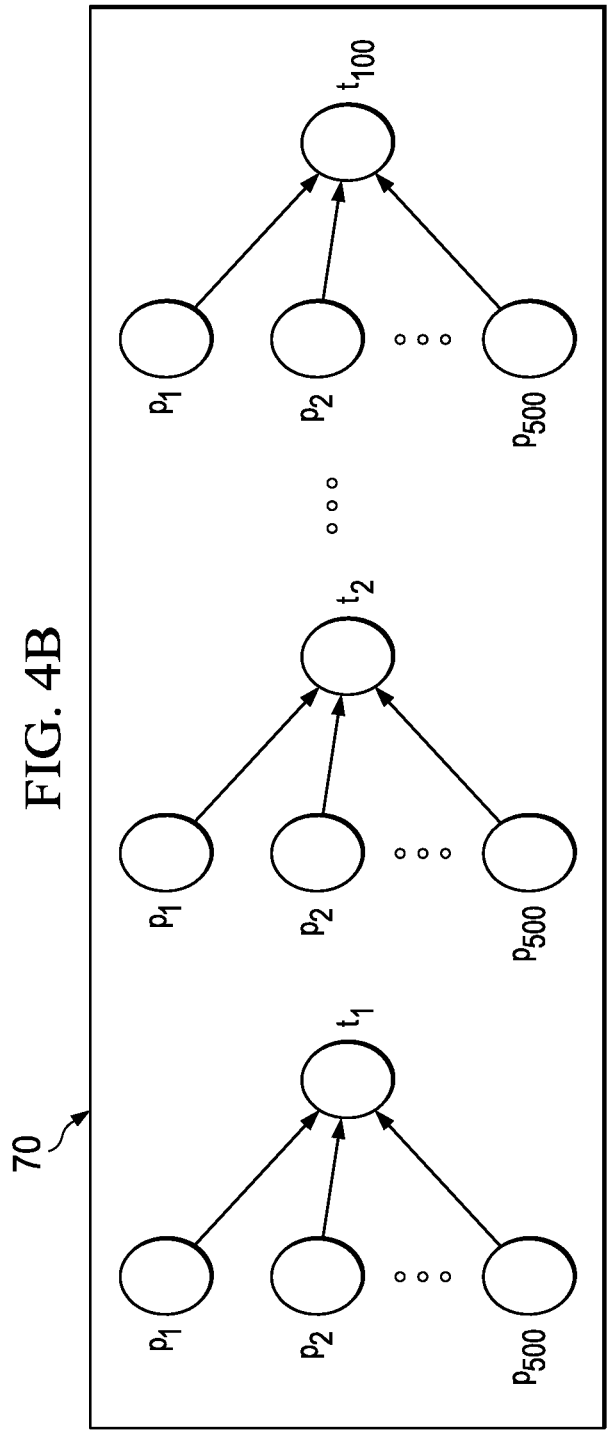

FIGS. 4A-4B are simplified schematic diagrams illustrating an example construction of neuron networks 60 and 70 in accordance with one embodiment of the present disclosure. Specifically, neuron network 60 illustrates 1000 failure syndromes and 97 repair actions in this particular example. The number of syndromes can be fixed for a specific test on a specific product. The number can be equivalent to the number of criteria and observation points that the diagnosis software used to determine pass or fail. For example, for one circuit board, the total number of syndromes (represented as 'P' in FIG. 4A) would be the union of syndromes from its diagnosis tests. Given a log file, the syndromes extracted from it can be encoded into a P-dimension binary vector. If a syndrome is extracted, its corresponding bit in the vector can be set to 1; otherwise, its bit can be set to 0. Note that the syndrome extraction effort is readily scalable.

A single-layer neuron network can be constructed for each repair action collected from all the training cases. An action can be defined as the instance and the component names of the replaced/repaired component. For example, if there are T training cases in which 'A' repair actions are taken, then 'A' neuron networks are constructed. Each neuron network has P inputs accepting the extracted syndrome vectors, and a single output to represent a unique repair action. The value of this output can indicate the probability to successfully repair the circuit board if its corresponding action is taken. During training, the output representing the same action of the training case can be set to 1, where the other neuron networks' outputs can be set to 0.

After the 'A' different neuron networks are trained, they would be ready to predict repair actions for new failure cases for circuit boards. The syndrome vector of a new failure case can be fed into the neuron networks, where each neuron network would generate a probability of its output. The action (or actions) with the highest probability (or probabilities) are expected to be taken to repair the circuit board.

Turning to neuron network 70, this example is similar to that described above. In this particular instance, neuron network is associated with 500 syndromes and 100 actions. The inputs are again representing fault syndromes, where the outputs are representing repair actions. A single-layer neuron network is created for each action in this example. For example, the input can be provided as 1/0 (where '1' indicates that the syndrome occurs and '0' indicates that the syndrome does not occur). Similarly, the output is defined as 1/0 (where '1' indicates the correct repair action and '0' indicates otherwise).

In terms of training, the weights can be computed based on the known syndromes and actions. For the diagnosis, the new syndromes can be fed into neuron networks, where the neuron network with the greatest output is chosen, and the action represented by this neuron network is the suggestion. In particular implementations of system 10, one-layer neuron networks can be provisioned to achieve the teachings outlined herein. Alternatively, multilayer neuron networks can be used. Since the number of total neuron networks can be determined by the total number of actions of the training cases (instead of the number of cases), the neuron network construction and training effort is also scalable. Hence, the entire methodology of the present disclosure is scalable to accommodate large-scale products.

Note that using neuron networks to analyze historical data allows a group of technicians to leverage both the existing fault isolation capabilities implemented in the diagnosis software, and the debug knowledge and experience attained by technicians over time. Suggestions produced by the diagnosis software are readily extracted from log files as syndromes and, further, are implicitly used during the training and the prediction phases. Technicians' repair actions can be represented by the outputs of the neuron networks, where these directly determine the structure of the neuron networks.

The proposed methodology is adaptive in that new knowledge can be readily added to train the neuron networks. As more historical data are accumulated, the neuron networks will become even more accurate and effective. This methodology, once implemented and deployed, makes debug knowledge obtained by an individual available to everyone and, further, eliminates the difficulty of knowledge transfer. Furthermore, human intelligence can explicitly be combined with the neuron networks to further improve accuracy and efficiency. For example, the weights of the neuron networks can be initialized based on human experiences. Human readable rules can be extracted from the neuron networks to provide in-depth training for technicians.

There are numerous advantages to leveraging neuron networks. In terms of their provisioning, weight initialization has significance in the actual neuron network training. There are various feasible solutions for the weights, where the correct diagnosis rate obtained by different weights can vary. In one particular instance, the architecture can initialize the weights by the occurrence possibilities of the failure syndromes. The correct diagnosis rate obtained using the weights initialized by the occurrence possibilities (60%) can be 10% higher than the rate obtained using randomly initialized weights (50%). This initialization can offer an ideal starting point for neuron networks: particular so when the sample size is small.

In many applications of neuron networks, input neurons represent failure syndromes and output neurons represent the faulty components. The data can be fed into one large neuron network. The training process could be time consuming and, further, requires a large memory for computation. In specific implementations of system 10, the architecture can split this large neuron network into a group of small neuron networks. Each small neuron network can have a single output neuron. The group size can be equal to the number of faulty components such that each network represents one faulty class. No changes would be made for the input neurons in such an example. It should be noted that the training time and memory are significantly reduced while, in the meantime, there is no sacrifice in the diagnostic accuracy.

Two-layer neuron networks are often suggested to address pattern classification problems. As noted, system 10 analyzes the relationship between failure syndromes and the repair actions by neuron networks. A one-layer network directly connects input syndromes to the output action, where the weight on each connection represents the impact of the syndrome for taking this action. Therefore, a one-layer network (without biases) addresses this problem well. There may be only minimal improvements using two-layer neuron networks in terms of diagnostic accuracy. Furthermore, including biases can even decrease the correct diagnosis rate. For the transfer function, a linear function can be taken, as it provides a high diagnostic resolution compared to a sigmoid and hardlim function.

Note that the actions suggested by neuron networks alone are difficult for technicians to use in comprehending the underlying failure reasons. Furthermore, mistakes in records are difficult to find. In accordance with certain implementations outlined herein, system 10 can automatically extract if-then rules. The extraction activities can be based on the weights of neuron networks. The failure syndrome (i.e., the input neuron) with the largest weight of a trained neuron network can be placed in the if-part, where the corresponding action (i.e., the output neuron) can be placed in the then-part. For example, the failure syndrome with the largest weight in a neuron network can be associated with errors occurring at counter 1, and the corresponding action of this neuron network is replacing this component A. Subsequently, the if-then rule is that if errors occur at counter 1, then the result is to replace component A. This linguistic interpretation helps technicians understand the connections between syndromes and actions. These automatically extracted rules provide great insights in fault diagnosis: especially in an initial product-ramp phase. In addition, nonsense rules are typically generated by neuron networks. These are possibly caused by erroneous historical records (e.g., typos, clerical issues, etc.). System 10 can identify the mistakes in a memory element (e.g., in the database) and re-train the neuron networks.

In addition to indicating the most likely failing component, system 10 (by leveraging the neuron networks) can provide a confidence level of replacement for all the components. The output value of a proposed neuron network (e.g., between 0 and 1) can be taken as the confidence level. The component with the highest confidence level of replacement can be defined as the most likely failing component. If the first attempt fails, the component with the next highest confidence level can be replaced.

FIG. 5 is a simplified schematic diagram illustrating an example of a fault syndrome and repair action extraction 80. This particular example reflects a segment of the log file of a spine-snake test associated with a particular circuit board. Additionally, in this particular example, the syndromes are parsed in eight (8) dimensions including: 1) error ID; 2) mismatched interface; 3) component with error/drop counter; 4) error counter; 5) drop counter; 6) component with interrupts; 7) interrupt bits; and 8) error messages. In this particular example, an error ID is provided as 0000010A, where a mismatched interface error is provided as r2d2-metro. It is imperative to note that other implementations of system 10 can include syndromes being parsed in less or more dimensions. In addition, different dimensions may be included, or hybrid combinations of the previously identified dimensions may be used. Any appropriate syndrome dimension is within the broad scope of the present disclosure.

Suitable actions can be selected from the associated repair history (e.g., including component no., instance ID, etc.). In this particular example, the component no. indicates the type of component (e.g., 15-11083-02 IC, 98X2239), while the instance ID indicates the appropriate location in order to distinguish the same type of components in different locations.

Figure 6:
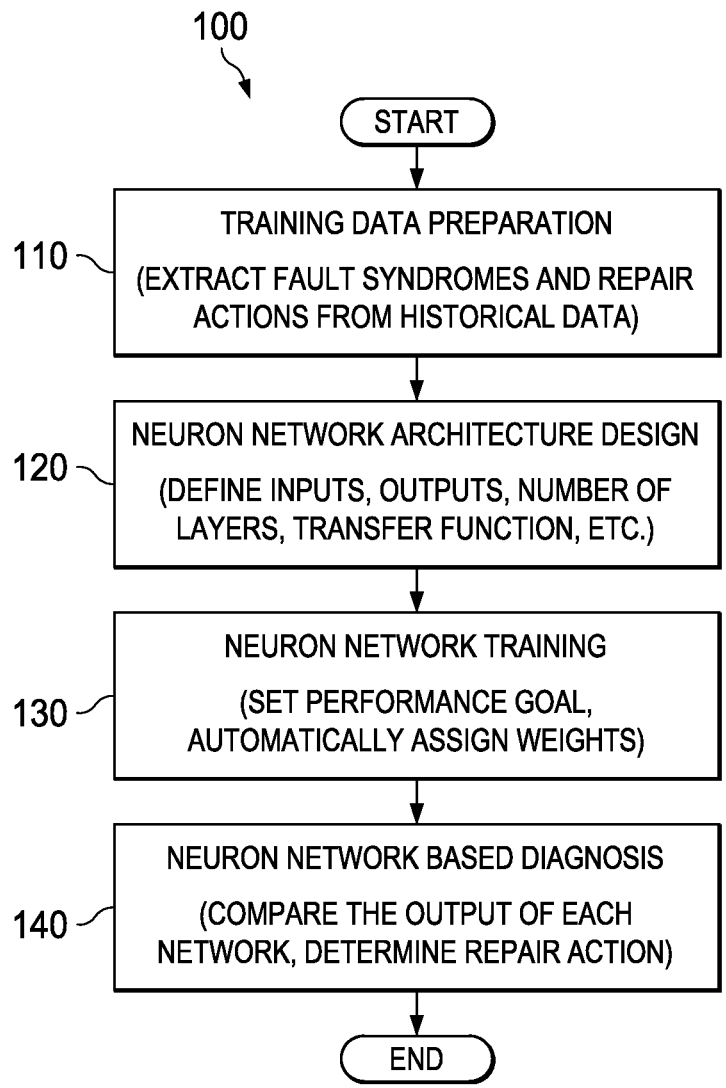
FIG. 6 is a simplified flowchart associated with the system in accordance with one embodiment of the present disclosure.

Turning to FIG. 6, FIG. 6 is a simplified flowchart 100 illustrating a summary of diagnosis activities using artificial neuron networks. This particular flow may begin at 110, where training data preparation occurs. This may include extracting fault syndromes and repair actions from historical data. At 120, the neuron network architecture design is implemented. This may include defining inputs, outputs, a number of layers, a transfer function, etc. At 130, neuron network training can be performed, which may include setting performance goals, (automatically) assigning weights, etc. At 140, the neuron network-based diagnosis can be executed. This can include comparing the output of each network, determining a suitable repair action, or any other remedial activity, which may be based on particular testing needs, specific device functions, certain testing environments, etc. Note that the actual 'inputs' and 'outputs' may take any suitable form, format, exchange protocol, communication medium, etc. In one particular example, the inputs and the outputs may be provided in some electronic data format (potentially generated in conjunction with a neuron network). Alternatively, the inputs and outputs can be communicated, transferred, and/or formulated manually, or through human interactions. Along similar lines, the collection of inputs can be done electronically, manually, the human interactions, etc. Also, many of these activities can be done automatically, once initially provisioned.

Note that in certain example implementations, some of the various functions or processes outlined herein may be implemented by logic encoded in one or more tangible media (e.g., embedded logic and logic gates provided in an application specific integrated circuit (ASIC)), digital signal processor (DSP) instructions, or software or firmware (potentially inclusive of object code and source code) to be executed by a processor, or other similar machine, etc.). Any memory element (e.g., provided as part of memory element 38) can store data used for the various operations outlined herein.

This includes a memory element being able to store software, logic, code, and/or processor instructions that can be executed to carry out the activities or code execution described or discussed in this Specification. A processor (or collection of logic gates) can execute any type of instructions associated with the data to achieve the operations detailed herein in this Specification. In one example, a processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA)), an erasable programmable read only memory (EPROM), an electrically erasable programmable ROM (EEPROM)) or an ASIC that includes digital logic, software, code, electronic instructions, or any suitable combination thereof.

In one example implementation, debugging tool 32 can include software in order to achieve the intelligent testing functions discussed herein. Debugging tool 32 can similarly include memory elements to be used in achieving intelligent testing functions discussed herein. Debugging tool 32 may further keep information in any suitable memory element (random access memory (RAM), ROM, EPROM, EEPROM, ASIC, etc.), software, hardware, or in any other suitable component, device, element, or object where appropriate and based on particular needs. Any possible memory items (e.g., database, table, cache, etc.) should be construed as being encompassed within the broad term memory element. Similarly, any of the potential processing elements, modules, and machines described in this Specification should be construed as being encompassed within the broad term processor.

Note that with the examples provided herein, interaction may be described in terms of two or three elements. However, this has been done for purposes of clarity and example only. In certain cases, it may be easier to describe one or more of the functionalities of a given set of flows by only referencing a limited number of integrated circuit and/or processor elements. It should be appreciated that the present disclosure (and its teachings) are readily scalable and can accommodate any number of devices or flows, as well as more complicated/sophisticated arrangements and configurations. Accordingly, the examples provided herein should not limit the scope or inhibit the broad teachings of the present disclosure as potentially applied to a myriad of other architectures.

It is also important to note that the steps discussed with reference to FIGS. 1-6 illustrate only some of the possible scenarios that may be executed by, or within, the present disclosure. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the present disclosure in that any suitable arrangements, chronologies, configurations, and timing mechanisms may be provided without departing from the teachings of the present disclosure.

Although the present disclosure has been described in detail with reference to particular embodiments, it should be understood that various other changes, substitutions, and alterations may be made hereto without departing from the spirit and scope of the present disclosure. Virtually any configuration that seeks to intelligently control testing operations could enjoy the benefits of the present disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A method, comprising:
    collecting inputs for a circuit board under test;
    evaluating historical repair records using a neuron network;
    providing repair actions for the circuit board based on the historical repair records; and
    providing an output reflecting a particular component of the circuit board to be replaced or to be repaired, wherein the output is associated with a developed probability of successfully fixing an issue that was identified by the test.

2. The method of claim 1, wherein the inputs include fault syndromes and log files associated with the circuit board under test.

3. The method of claim 1, wherein at least one of the inputs of the neuron network is a syndrome vector extracted from a failure log.

4. The method of claim 1, wherein particular outputs having higher probabilities are selected as the repair actions.

5. The method of claim 1, wherein the neuron network is weighted using diagnosis knowledge weights.

6. The method of claim 1, wherein the inputs include syndromes selected based on hardware designs and software designs related to the circuit board.

7. The method of claim 1, wherein a resultant of the repair actions is fed back into the neuron network.

8. Logical, executable process steps encoded in one or more non-transitory, tangible, computer readable media when, executed by a processor, operate to perform operations comprising:
    collecting inputs for a circuit board under test;
    evaluating historical repair records using a neuron network;
    providing repair actions for the circuit board based on the historical repair records; and
    providing an output reflecting a particular component of the circuit board to be replaced or to be repaired, wherein the output is associated with a developed probability of successfully fixing an issue that was identified by the test.

9. The computer readable media of claim 8, wherein the inputs include fault syndromes and log files associated with the circuit board under test.

10. The computer readable media of claim 8, wherein at least one of the inputs of the neuron network is a syndrome vector extracted from a failure log.

11. The computer readable media of claim 8, wherein particular outputs having higher probabilities are selected as the repair actions.

12. The computer readable media of claim 8, wherein the neuron network is weighted using diagnosis knowledge weights.

13. The computer readable media of claim 8, wherein the inputs include syndromes selected based on hardware designs and software designs related to the circuit board.

14. The computer readable media of claim 8, wherein a resultant of the repair actions is fed back into the neuron network.

15. An apparatus, comprising:
   a processor;
   a memory element; and
   a debugging tool, wherein the apparatus is configured for:
      collecting inputs for a circuit board under test;
      evaluating historical repair records using a neuron network;
      providing repair actions for the circuit board based on the historical repair records; and
      providing an output reflecting a particular component of the circuit board to be replaced or to be repaired, wherein the output is associated with a developed probability of successfully fixing an issue that was identified by the test.

16. The apparatus of claim 15, wherein the inputs include fault syndromes and log files associated with the circuit board under test.

17. The apparatus of claim 15, wherein at least one of the inputs of the neuron network is a syndrome vector extracted from a failure log.

18. The apparatus of claim 15, wherein particular outputs having higher probabilities are selected as the repair actions.

19. The apparatus of claim 15, wherein the neuron network is weighted using diagnosis knowledge weights.

20. The apparatus of claim 15, wherein the inputs include syndromes selected based on hardware designs and software designs related to the circuit board.

* * * * *